(12) United States Patent
Kirchhofer

(10) Patent No.: US 9,987,607 B2
(45) Date of Patent: Jun. 5, 2018

(54) METHOD FOR PRODUCING POWDER FROM A GRANULAR, THERMOPLASTIC MATERIAL AND DEVICE FOR PRODUCING CHIPS FROM A POWDERY, THERMOPLASTIC MATERIAL

(71) Applicant: BBA Innova AG, Aarau (CH)

(72) Inventor: Urs Kirchhofer, Sempach (CH)

(73) Assignee: BBA Innova AG, Aarau (CH)

( * ) Notice: Subject to any disclaimer, the term of this patent is extended or adjusted under 35 U.S.C. 154(b) by 640 days.

(21) Appl. No.: 14/400,923

(22) PCT Filed: Apr. 29, 2013

(86) PCT No.: PCT/EP2013/058913
§ 371 (c)(1),
(2) Date: Nov. 13, 2014

(87) PCT Pub. No.: WO2013/171061
PCT Pub. Date: Nov. 21, 2013

(65) Prior Publication Data
US 2015/0145161 A1    May 28, 2015

(30) Foreign Application Priority Data

May 15, 2012    (CH) .................................... 00685/12

(51) Int. Cl.
*B01J 2/22* (2006.01)
*B01J 2/26* (2006.01)
(Continued)

(52) U.S. Cl.
CPC . *B01J 2/22* (2013.01); *B01J 2/26* (2013.01); *B29B 9/04* (2013.01); *B29B 13/10* (2013.01);
(Continued)

(58) Field of Classification Search
CPC ..................................... B01J 2/26; B29B 9/08
See application file for complete search history.

(56) References Cited

U.S. PATENT DOCUMENTS

| 4,934,928 A | 6/1990 | Akamatsu |
| 5,394,922 A * | 3/1995 | Colson .................... B29C 65/02 |
| | | 160/121.1 |

(Continued)

FOREIGN PATENT DOCUMENTS

| DE | 36 01 135 A1 | 7/1987 |
| EP | 0 485 037 A2 | 5/1992 |

(Continued)

OTHER PUBLICATIONS

International Search Report dated Sep. 18, 2013 for International application No. PCT/EP2013/058913.

*Primary Examiner* — Ryan Ochylski
(74) *Attorney, Agent, or Firm* — Morgan, Lewis & Bockius LLP

(57) ABSTRACT

A method for producing powder from a coarsely granular, thermoplastic material, comprising a homogenizing first device produces a first melt from a non-homogeneous pre-mixture of the material; first chips are produced from the first melt in a second device; the chips are milled to a powder; the powder is separated into at least two fractions with coarser and finer particle sizes; and a selected fraction with finer particle sizes is returned to the method prior to milling; wherein a second melt is produced from the selected fraction in a non-homogenizing third device, with second chips being produced from the latter, and the second chips are combined with the first chips and milled with each other.

12 Claims, 2 Drawing Sheets

(51) Int. Cl.
*B29B 9/04* (2006.01)
*B29B 13/10* (2006.01)
*B29C 47/08* (2006.01)
*B29C 47/36* (2006.01)

(52) U.S. Cl.
CPC ........ *B29C 47/0894* (2013.01); *B29C 47/366* (2013.01); *Y02P 70/263* (2015.11)

(56) References Cited

U.S. PATENT DOCUMENTS 6,355,194 B1 3/2002 Agur et al.
2001/0032696 A1* 10/2001 Debalme ............... B29C 70/504
                                              156/172

FOREIGN PATENT DOCUMENTS

GB          1 115 026 A    5/1968
WO     2011/047491 A1     4/2011

* cited by examiner

METHOD FOR PRODUCING POWDER FROM A GRANULAR, THERMOPLASTIC MATERIAL AND DEVICE FOR PRODUCING CHIPS FROM A POWDERY, THERMOPLASTIC MATERIAL

TECHNICAL AREA

The present invention relates to the area of producing powder from a granular, thermoplastic material, wherein a homogenizing first device produces a first melt from a non-homogeneous pre-mixture of the material, wherein first chips are produced from the first melt in a second device, wherein the chips are milled to a powder, wherein this powder is separated into at least two fractions with coarser and finer particle sizes, and wherein a selected fraction with finer particle sizes is returned to the method prior to milling. For example, the powder can be one for powder coatings or toners for laser printers or copiers. The chips are frequently also referred to as flakes. In particular, the fraction with the finer particle sizes also involves a dusty material called fines.

The invention further relates to a method for producing chips from a powdery, thermoplastic material, which can be used in the aforementioned method.

PRIOR ART

Depending on the properties desired for the powder, known methods for producing powder from a granular, thermoplastic material involve preparing a pre-mixture of various components in a first step. The components are here supplied in varying forms, in particular as granules, in the form of chips and/or as powder that is already more or less fine. The components also do not all have to be thermoplastic. In the case of toners, for example, the pre-mixture contains a significant percentage of graphite or color pigments as the additive in powder form in addition to the actual thermoplastic binder in granule form. Within the framework of the present invention, however, such a pre-mixture is also regarded as a thermoplastic material, as long as it essentially behaves in a thermoplastic manner overall in terms of fusibility and resolidification.

During its preparation, the pre-mixture is more or less non-homogeneous. For homogenization purposes, it is melted in an extruder as the first device, wherein the shear forces exerted by the extruder screw effect homogenization. Non-melting additives are dispersed in the process. The hot melt exiting the extruder is cooled in a continuous cooling system as a second device, and broken up into chips by a crusher in the cooling system. The size of these chips is usually selected so as to make them pneumatically easy to transport.

The chips are thereupon conveyed to a mill, in which they are milled into a finer powder. The powder unavoidably has a certain particle size distribution that as a rule resembles a Gaussian distribution, wherein the milling method selected and mill used make it possible to change the position of the maximum as well as the width of this distribution, optimizing the latter with regard to the desired powder application. However, not all particle sizes can then be used in certain applications, such as in toners, so that additional measures have to be taken to further subdivide the particle size distribution, or at least separate out a fraction with very fine particle sizes (the so-called fines). Cyclone precipitators and/or filters are used for this purpose.

As a rule, the separated fraction(s) yield(s) production rejects. In the case of toners, the percentage of these rejects can measure up to 25%. This is why it makes sense to recycle them and return them to the producing process. This is already done by adding the rejects to the pre-mixture, which is supplied to the extruder. In the extruder, they are melted and homogenized together with the newly introduced material.

However, the disadvantage to this type of recycling is that the net throughput of the extruder is greatly diminished by two influences, specifically by the percentage of material already extruded beforehand, and by the air contained in the finely granulated material. The finer the powder, the more air it contains, and the more pronounced the effect.

DESCRIPTION OF THE INVENTION

One object of the invention is to indicate a method of the kind mentioned at the outset that avoids this disadvantage. This object is achieved in the invention by the method according to claim 1, which thus is characterized in that a second melt is produced from the selected fraction in a non-homogenizing third device, with second chips being produced from the latter, and that the second chips are combined with the first chips and milled with each other.

The invention makes use of the circumstance that the fraction selected for return is itself already homogenous. In this regard, it is sufficient that the latter fraction be used without being homogenized again and run through the extruder again in order to produce chips that can be easily combined with the chips produced from the newly used material running through the extruder, and milled together with the latter. In particular, producing chips from the fraction selected for return also requires no second extruder. A third device designated above without any homogenizing effect is sufficient. Such a device, which will be described below and also represents the subject matter of the present invention, can be more favorable than an extruder in terms of both procurement and energy consumption.

The selected fraction can be returned in batches or continuously. At least in the latter case, it is preferred that the selected fraction, once separated, be relayed to the third device over a short path, wherein the dimensions of this path can as a rule be significantly shorter than the distance to the first device, i.e., to the extruder. In particular if the powdery portions are explosion-proof in design and set up spaced apart from the remaining portions, and potentially even in separate rooms, the distance to the extruder can be rather large. By contrast, the chips produced in the third device can be reliably and smoothly transported over larger distances, e.g., pneumatically.

Another object of the invention is to indicate a device for producing chips from a thermoplastic material in powder form, which can be used in the method according to the invention as a third device, and which is more favorable than an extruder in terms of procurement costs and its energy consumption. This object is achieved in the invention by a device according to claim 6. This device is here provided with a heating roller, a cooling roller, a crusher, a first circulating belt, a second circulating belt and a feeder for thermoplastic material in powder form on one of the two belts, wherein both belts run one above the other with the material in between over the heating roller, the cooling roller, and up to the crusher.

Even with regard to the device according to the invention, the invention makes use of the circumstance that the fraction selected for return is itself already homogeneous and requires no homogenization in the method according to the invention. Melting without recirculation under exposure to shear is sufficient. In this regard, no expensive extruder is required. The invention only provides a heating roller as a means for melting. The energy required to melt the powdery material with the heating roller is less than the energy required by the extruder. In the case of toners, for example, it is enough to heat the material with the heating roller to a temperature of between 70° and 120° C., while 150° to 200° C. is typically required in extruders. The quantity of heat to be dissipated with the cooling roller is correspondingly lower. The melted material is also fed to the cooling roller over the shortest path and resolidified again via the two belts.

The heat supplied to the material with the heating roller and dissipated from it with the cooling roller must respectively pass through the belt that is in contact with these rollers. For this reason, it is beneficial that the same respective one of the two belts be in contact with both rollers, and that this belt be readily heat conductive. The other belt then does not have to be so readily heat conductive. In this case, its job on both rollers is to exert a certain pressure on the material to keep it on the rollers. To this end, it must be exposed to a stress, and can be optimized for this purpose.

The ability to supply powdery material to one of the two belts requires that this belt be guided separately from the other belt over a certain distance. The supply preferably generates a carpet of powder on one of the two belts, which if possible should exhibit a uniform and defined thickness. As soon as the other belt comes back, the still powdery material is exposed to a pressure between the belts. Air contained therein is pressed out, and counter-currently exits the gap between the two converging belts. This causes the material to lose volume, thereby reducing the distance between the belts. The removal of air has a favorable effect on the melting and subsequent resolidification of the material, since air is a poor heat conductor, and would impede and delay both the penetration of heat into the material on the heating roller, and the dissipation of heat from the material on the cooling roller.

In order to press the air out of the gap between the two belts as effectively as possible, it is preferred that the other belt be guided onto the heating roller around a draw-in roller, so that the distance between the deflection roller and heating roller fixes the width of the gap. It is further preferred that this distance also be adjustable. As a result, the width of the gap can be adjusted to the respective conditions, such as the thickness of the powder carpet, the fineness of the powdery material and/or the quantity of air contained therein.

In order to achieve an efficient heat transfer or good utilization of the heating and cooling roller, the two belts with the thermoplastic material in between them should be slung around the heating roller and cooling roller by more than 180°. This can be easily achieved by guiding the two belts between the two rollers around a deflection roller.

It is sufficient that only one roller, preferably the cooling roller, be driven, with the remaining rollers, belts and deflection rollers for the belts also being moved by the one driven roller.

The draw-in roller and/or deflection roller can additionally be heated. Heating the first deflection roller helps draw in the powdery material between the two belts, heat the second deflection roller and melt the material. The deflection roller can alternatively also be cooled to support the cooling roller.

It is further preferred that the heating roller and cooling roller only be mounted on one side, as is the case with respect to the rolling cooler known from WO 2011/047491 A1. The entire device and in particular its parts that come into contact with the thermoplastic material are then readily accessible from the other side, and can be easily dismantled and easily cleaned when needed. The rolling cooler known from WO 2011/047491 A1 can also be advantageously used as a second device within the framework of the method according to the invention.

Finally, the heating roller can also be provided with at least one heater bar, with which the material between the two belts can be additionally heated from outside with radiant heat.

BRIEF EXPLANATION OF THE FIGURES

The invention will be explained in more detail below based upon exemplary embodiments in conjunction with the drawing. Shown on.

WAYS TO IMPLEMENT THE INVENTION

Figure 1:
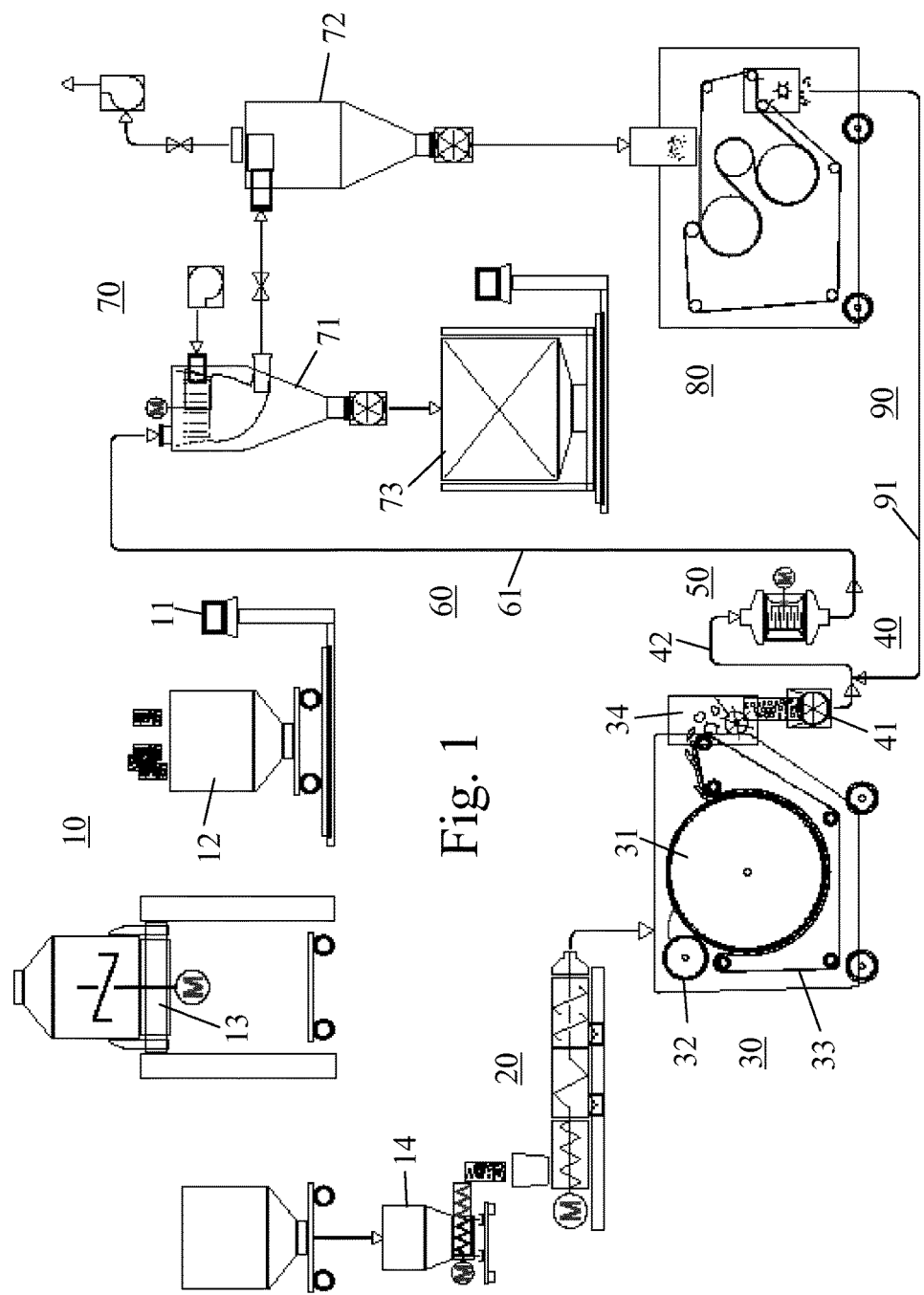
FIG. 1 is a diagram of a system for producing powder based on the method according to the invention.

In the sequence in which the method according to the invention is implemented therewith, the system on FIG. 1 exhibits a pre-mixing unit 10, an extruder 20, a continuous cooler in the form of a rolling cooler 30, first transport means 40, a mill 50, second transport means 60, a separating unit 70, a device 80 according to the invention for producing chips from a thermoplastic material in powder form, as well as third transport means 90.

The pre-mixing unit 10 encompasses a scale 11, a container 12, a mixer 13 and a metering device 14. Granular material to be processed is filled into the container 12 on the scale and weighed. As a rule, different materials with varying particle sizes are here brought together. At least one of these materials is to be thermoplastic. The mixer 13 is used to mix the material accommodated in the container 12. The pre-mixture obtained in this way is supplied from the container 12 to the extruder 20 via the metering device 14.

The material is melted in the extruder 20. The strong shear forces exerted by the extruder screws in the melted material homogenize the latter. Non-melting portions are dispersed.

The hot, plastic or pasty strand exiting the extruder 20 flows directly into the rolling cooler 30 located underneath the extruder. The rolling cooler encompasses a cooling roller 31, a squeegee 32, a pressure belt 33 and a crusher 34. The plastic strand is first rolled between the cooling roller 31 and squeegee 32 into a thin film that extends approximately over the entire width of the rollers. This film runs along a partial circumference of the cooling roller 31, wherein it is made to abut against the cooling roller 31 by the pressure belt 33. The cooling roller 31 is cooled by a coolant streaming through it. As a result, the cooling roller 31 is able to absorb and dissipate heat from the film. While being cooled in this way, the film begins to solidify. The at least partially already solidified film is supplied via the pressure belt 33 to the crusher 34, which breaks it up into individual pieces, so-called chips.

The chips generated by the crusher 34 fall downward into a discharge sluice 41 of the first transport means 40, from where they are relayed pneumatically by way of a line 42, i.e., in an air stream, to the mill 50, in which they are ground into a powder.

The powder generated by the mill 50 is conveyed to the separating unit 70 by way of the second transport means 60 in a line 61, again pneumatically. In the separating unit 70, the powder is separated into two fractions with varying particle sizes or particle size distributions. This is accomplished with two serially operated cyclone precipitators 71 and 72, which in turn are connected to each other via pneumatic lines.

The first cyclone precipitator 71 separates a first, coarsest fraction of the powder, which is downwardly discharged into the container 73. In the case of toners, this fraction corresponds to the desired product, since toners cannot exhibit any very fine portions. The separated particle sizes are typically larger than 10 micrometers for toners.

A fraction with finer particle sizes is separated out in the second cyclone precipitator 72. This fraction is discharged in the device 80 according to the invention, in which it is reworked into reusable chips, as will be described below.

After the second cyclone precipitator 72, the air stream contains only a very small portion of powder with particle sizes of less than 1 micrometer, which can still be eliminated from the air stream, if necessary by filters (not shown), before it is released into the environment. Under certain conditions, this portion could also be separated out with a third cyclone precipitator (also not shown) and recycled as needed.

In the case of toners, the portion of directly usable coarsest fraction typically measures 75 to 90% w/w. The portion of finer fraction typically measures between 10 and % w/w. Given this distribution, which is similar for other products, it may be beneficial to recycle the fraction with the finer particle sizes.

As already mentioned, this is why the fraction with the finer particle sizes is supplied to the device 80 in the system on FIG. 1, so as to produce chips from the latter that are reintroduced into the process. The chips are transported from the device 80 by the third transport means 90 with a pneumatic line 91, which empties into the line 42 of the first transport means 40 before the mill 40.

An embodiment of the device 80 will be described below based on FIGS. 2 and 3.

Figure 2:
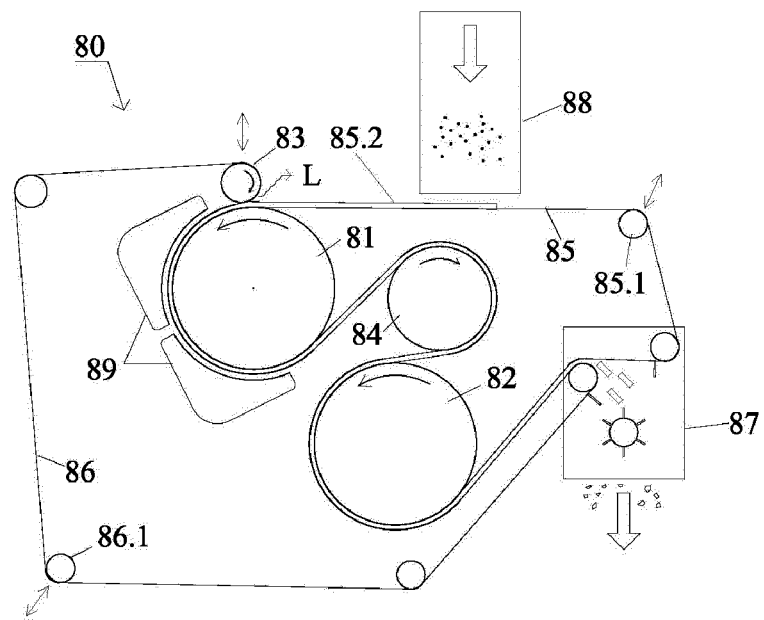
FIG. 2 is a diagrammatic view of a device according to the invention for producing chips from a thermoplastic material in powder form.

As most evident in the diagrammatic view on FIG. 2, the device 80 in this embodiment encompasses a heating roller 81, a cooling roller 82, a draw-in roller 83, a deflection roller 84, a circulating lower belt 85, a circulating upper belt 86, a crusher 87 and a feeder 88 for the powdery material to be processed. The two belts 85 and 86 run on top of each other on the heating roller 81, the second deflection roller 84 and the cooling roller 82, as well as up to the crusher 87, wherein the lower belt 85 is in direct contact with the heating roller 81 and cooling roller 81. The upper belt 86 is in contact with the deflection roller 84. By being deflected around the deflection roller 84, the two belts 85, 86 are slung around the heating roller 81 and cooling roller 82 by more than 180° each.

The two belts 85, 86 are guided between the crusher 87 and heating roller 81 separately from each other via several rollers, wherein the rollers 85.1 and 86.1 can be adjusted in the directions denoted by the arrows on FIG. 2. As a result, the belts 85, 86 can be stressed.

From the heating roller 81, the lower belt 85 runs horizontally under the feeder 88, which sprinkles the powdery material onto the lower belt 85 in the form of a uniformly thin carpet. The thickness of the carpet measures 8 to 12 mm for toners with particle sizes of between 1 and 5 micrometers, for example.

The upper belt 86 is then moved toward the lower belt 85 via the draw-in roller 83, specifically on the heating roller 81 shortly after the lower belt 85 has reached the heating roller 81. The powdery material runs into the resultant gap. Embedded between the belts 85, 86, it then runs over the heating roller 81, where it is melted while exposed to the contact pressure exerted by the upper belt 86, and over the cooling roller 82, where it is solidified into a kind of film again, up to the crusher 87, into which it falls piece by piece. In order to allow this to happen, the upper belt 86 is guided downwardly away from the lower belt 85 at the inlet of the crusher 87, while the lower belt 85 essentially still passes horizontally through the crusher 87. The crusher 87 comminutes the solidified material into chips with the desired size. For example, the latter measures between 5 and 10 mm, corresponding to the size of the chips generated by the rolling cooler 30.

The width of the mentioned gap between the lower belt 85 and upper belt 86 is determined by the mutual distance between the heating roller 81 and first deflection roller 83, minus the thickness of both belts 85, 86. The adjustability of the draw-in roller 83 makes it possible to set the width of this gap.

The stress of the upper belt 86 causes the powdery material to end up on the heating roller 81 under a pressure, and to become compressed, as a result of which air contained in the powdery material is pressed out. The air exits the gap in a counter-current, as denoted on FIG. 2 by the arrow marked L. Suitably adjusting the width of the gap and stress of the upper belt 85 makes it possible to optimize the entry of powdery material into the gap, the escape of air from the gap, and the compression of powdery material in the gap. If needed, the entry of powdery material into the gap can be improved even more by heating the first deflection roller 83.

The lower belt 85, through which the heat is supplied to the heating roller 81 and dissipated onto the cooling roller, conducts heat more readily than the upper belt 86, which is optimized with respect to the pressure it is primarily intended to exert.

The deflection roller 84 can be cooled or alternatively heated. As a result, it can be used either to support the heating roller 81 or the cooling roller 82.

A more or less hot or cold fluid is guided through the rollers and/or rolls for heating or cooling purposes.

Of parts 81 to 86, only the cooling roller 82 is driven. The other parts are taken along by the cooling roller.

Another two heater bars 89 are marked 89 on FIG. 2 and used to introduce heat into the material to be melted between the belts 85, 87 on the heating roller 81, even from outside if so required. Because the heater bars 89 do not contact the external upper belt 86 on the heating roller, the heat is only conveyed as radiant heat.

Figure 3:
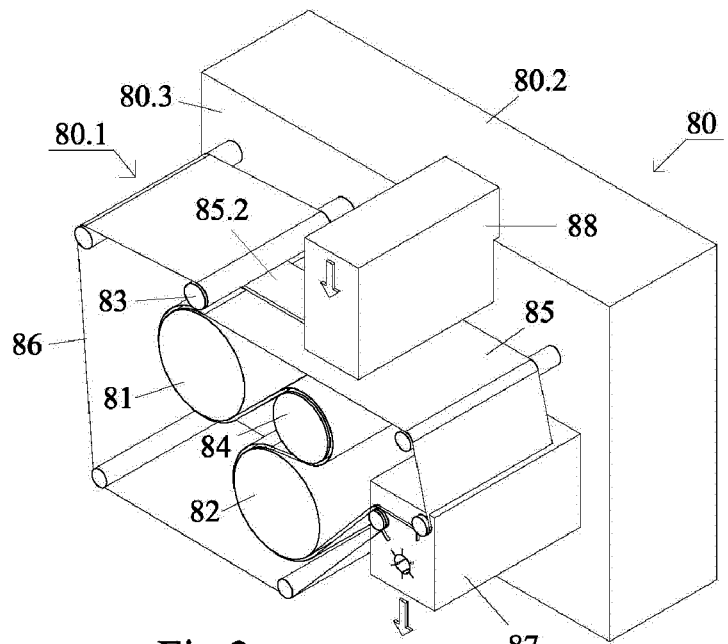
FIG. 3 is a perspective view of the same device.

As may be gleaned from the perspective view of the device 80 on FIG. 3, parts 81 to 89 described above are arranged in a process room 80.1 and unilaterally fitted or mounted on a separating wall 80.3 in relation to a machine room 80.2. If need be, these parts are also driven only unilaterally from the machine room 80.2, and supplied with heating or cooling liquid. Therefore, they are readily accessible from the front side on FIG. 3, and can be dismantled as required and in any case easily and effectively cleaned. At the same time, the drives, mounting and supply units located in the machine room 80.2 are protectively situated behind the separating wall 80.3, and do not come into contact with the powdery or post-melting pasty material.

The two belts 85, 86 in device 80 can exhibit a width of 60 to 100 cm. Suitable belts include glass fiber belts or Kevlar fabric belts with Teflon coating having a thickness of 0.25 to 0.40 mm. Diameters of 40 to 100 cm are suitable for the heating roller 81 and cooling roller 82. The draw-in roller 83 can have a diameter of 10 to 30 cm, and the deflection roller 84 a diameter of 20 to 50 cm. The gap between the heating roller 81 and draw-in roller 83 could be adjustable between 4 and 30 mm.

If the two belts 85, 86 were guided in some other suitable manner, the powdery material could also be applied to the upper belt 86. However, the progression of belts and spatial arrangement of rollers would be less favorable in this case.

The method described according to FIG. 1 is continuous. However, it could also be performed in individual steps while correspondingly temporarily storing the intermediate products, for example in particular the chips generated in the rolling cooler 30 and device 80 according to the invention. Another continuous cooling system could also be used in place of a rolling cooler, for example a belt cooler.

REFERENCE LIST

Pre-mixing unit 10
Scale 11
Container 12
Mixer 13
Metering device 14
Extruder 20
Rolling cooler 30
Cooling roller 31
Squeegee 32
Pressure belt 33
Crusher 34
First transport means 40
Discharge sluice 41
Pneumatic line 42
Mill 50
Second transport means 60
Pneumatic line 61
Separating unit 70
Cyclone precipitator 71 and 72
Container 73
Device according to 80 the invention
Process room 80.1
Machine room 80.2
Separating wall 80.3
Heating roller 81
Cooling roller 82
Draw-in roller 83
Deflection roller 84
Lower belt 85
Tension roller 85.1
Carpet 85.2
Upper belt 86
Tension roller 86.1
Crusher 87
Feeder 88
Heater bar 89
Third transport means 90
Pneumatic line 91
Air L

The invention claimed is:

1. A device for producing chips from a powdery, thermoplastic material, comprising:

a heating roller being heated and thereby capable of melting the thermoplastic material;
a cooling roller being cooled and thereby capable of solidifying the melted thermoplastic material into a film;
a crusher being capable of comminuting solidified pieces of the thermoplastic material into said chips;
a first and a second circulating belt; and
a feeder being capable of applying the thermoplastic material in powder form onto the first belt,
wherein the two belts commonly run over the heating roller, a deflection roller, the cooling roller, and up to the crusher, the first belt thereby being in contact with the heating roller and the cooling roller;
wherein the two belts are commonly slung around the heating roller and the cooling roller by more than a respective 180° in that they are guided between the heating roller and the cooling roller around the deflection roller with which the second belt is in contact,
wherein the two belts are guided separately from each other between a first position at the crusher and a second position at the heating roller, a gap being formed between the two belts at the second position,
wherein the feeder is located with respect to the circulating direction of the first belt upstream of the second position and is capable of applying thermoplastic material in powder form onto the first belt, on which it is moved still in powder form into said gap between the two belts,
wherein the thermoplastic material is moved embedded between the first and the second belt over the heating roller where it is melted an over the cooling roller where it is solidified, and
wherein, at the first position, solidified thermoplastic material is allowed to fall piece by piece into the crusher to be comminuted into said chips.

2. The device according to claim 1, wherein the material is applied in powder form through the feeder as a carpet with a uniform thickness onto the first belt.

3. The device according to claim 1, wherein the first belt conducts heat more readily than the second belt.

4. The device according to claim 1, wherein the second belt is stressed, and exerts a pressure on the material as this stress acts on the heating roller and cooling roller.

5. The device according to claim 1, wherein the second belt is moved toward the first belt via a draw-in roller on the heating roller.

6. The device according to claim 5, wherein the distance between the draw-in roller and the heating roller can be adjusted.

7. The device according to claim 5, wherein the draw-in roller is heated.

8. The device according to claim 1, wherein the deflection roller is heated.

9. The device according to claim 1, wherein the deflection roller is cooled.

10. The device according to claim 1, wherein only one of the rollers is driven, and the other roller(s) along with the two belts are moved by this one roller.

11. The device according to claim 1, wherein the rollers are only unilaterally mounted.

12. The device according to claim 1, wherein the heating roller is provided with at least one heater bar, with which the thermoplastic material between the two belts is additionally heated from outside with radiant heat.

* * * * *